United States Patent Office 3,686,089
Patented Aug. 22, 1972

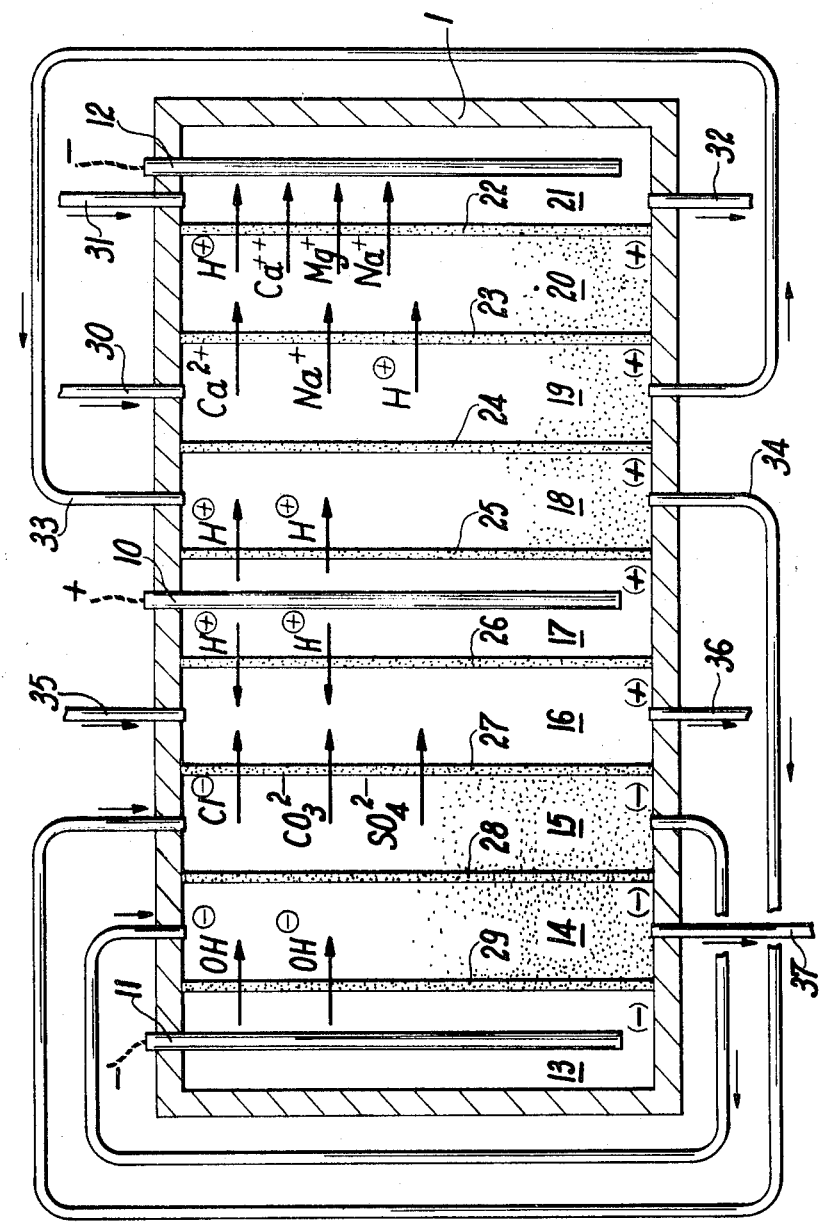

3,686,089
METHOD OF SEPARATION OF IONS
FROM A SOLUTION
Emmanuel Korngold, 8 Rue Sokolov, Shikun. A., Beersheba, Israel, and Eric Selegny, 49 Rue A. Bouquet, 76 Rouen, France
Filed July 23, 1968, Ser. No. 746,984
Claims priority, application France, July 25, 1967, 115,620; May 6, 1968, 150,621
Int. Cl. B01k 5/00
U.S. Cl. 204—180 P
6 Claims

ABSTRACT OF THE DISCLOSURE

A method of separation of ions from a solution, characterized in that the solution to be treated is passed through a bed of at least one type of resin in which is produced an electric field substantially at right angles to the direction of propagation of said solution, the geometry of the resin bed, the composition of the bed, the conductivity of the solution and the potential difference which exists between the poles of the electric field being chosen so that the ions which are to be removed from the solution transport the current by passing essentially through the resin, and that said ions are collected continuously on the side corresponding to the pole which is of opposite sign to that of the ions to be removed.

This invention relates to a method and apparatus for the separation of ions from a solution and is also concerned with the application of the method to water softening and the demineralization of water.

In the methods of separation of ions from a solution which makes use of ion exchange resins, it proves necessary to regenerate the resins at frequent intervals. The present invention proposes a method which permits of continuous separation of ions without any need to carry out intermittent regeneration of the resins employed.

The method in accordance with the invention is characterized in that the solution to be treated is passed through a bed of at least one type of ion-exchange resin in which is produced an electric field substantially at right angles to the direction of propagation of said solution, the geometry of the resin bed, the composition of the bed, the conductivity of the solution and the potential difference which exists between the poles of the electric field being chosen so that the ions which are to be removed from the solution transport the current by passing esesntially through the resin, and that said ions are collected continuously on the side corresponding to the pole which is of opposite sign to that of the ions to be removed.

The method is carried out in an electrolytic tank which comprises a plurality of compartments filled with ion-exchange resin, said compartments being disposed in adjacent relation with interposition of means which are capable of limiting the passage of those ions which are not to be removed, inlets for the admission of the solution to be processed and located at the top of the intermediate compartments or compartments located in proximity to the pole of said electric field which is of opposite sign to that of the ions to be removed, outlets for the discharge of solutions which are depleted in some ions and located at the lower ends of said compartments, means whereby the solution which is depleted in ions to be removed from the solution to be processed can be recycled and passed successively through the different compartments in the direction of the pole which is of opposite sign to that of the ions which are to be removed from the solution being processed.

Apart from these principal arrangements, the invention consists in further arrangements which are preferably employed at the same time and which will be described in greater detail hereinafter.

The complementary description which now follows and the accompanying drawings will in any case serve to provide a clear understanding of the invention and, as will be apparent, are given solely by way of indication.

In these drawings:

FIG. 4 shows a plant for water softening and demineralization of water in accordance with the invention.

The electrolytic tank 1 is divided into a series of compartments by means of membranes such as the membrane 22 which are permeable to the ions to be separated. The intermediate compartments 18, 19, 20 are filled with ion-exchange resins. The liquid to be processed is introduced at the top of said intermediate compartments. An electric field is established between the anode and the cathode at right angles to the direction of propagation of said liquid. A solution which has become depleted in the ion which migrates through the diaphragm in the direction of the cathode is withdrawn at the lower end of the compartment in which the liquid to be processed has been introduced and a solution which has become enriched in the ion which has migrated through the membranes is withdrawn at the cathode side.

It will now be assumed by way of example that calcium is to be removed from a solution containing calcium and potassium, in which case it is an advantage to make use of a resin of the type known as Amberlite 120.

In order to bring the conductivity of the solution to a value such that the calcium transports the current through the resin, the sum of concentrations of calcium and of potassium can be brought to a value of the order of $2 \times 10^{-2}$ N.

The potential difference established between the poles of the electric field is chosen such that the current referred-to above has an intensity of the order of 200 ma.

Figure 1:
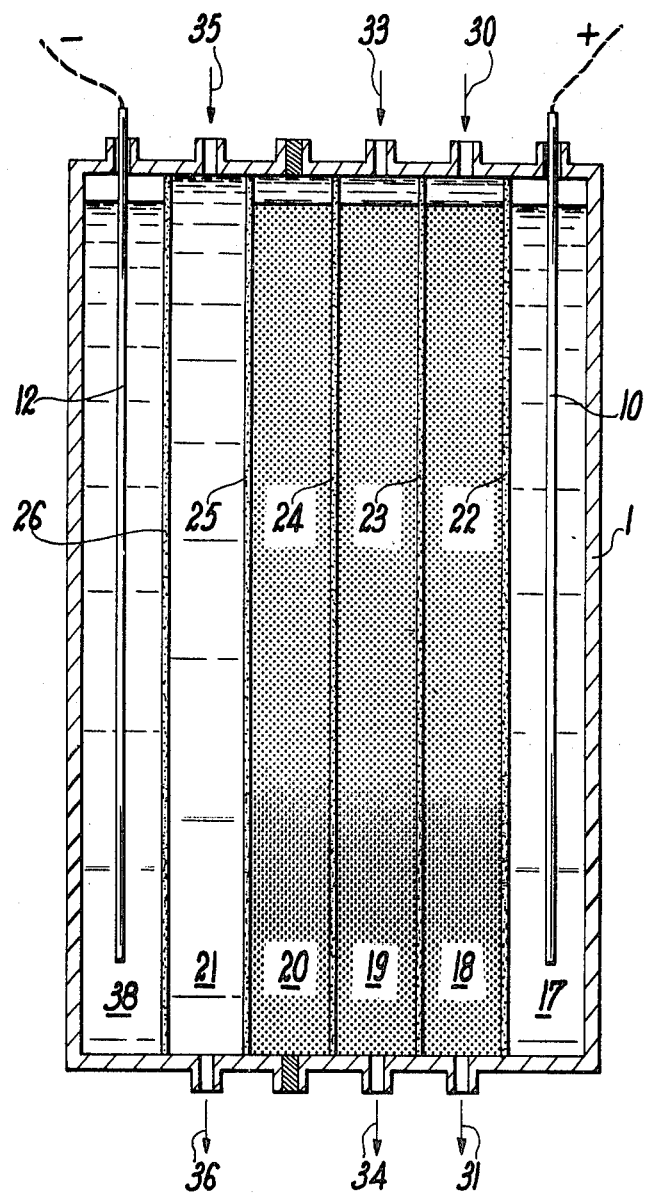
FIGS. 1 and 2 show diagrammatically to devices which are designed for the practical application of the method according to the invention.

In order to carry out this method, use can be made of a device of the type which is shown diagrammatically in FIG. 1 and which comprises three compartments 18, 19 and 20, said compartments being filled with resin and separated from each other by cation-exchange membranes such as the membrane 22, for example of the type marketed by the Asahi Company under the trade name CMV 10. In order to produce the electric field referred-to above, an anode compartment 17 and a cathode compartment 38 are placed on each side of the compartments 18, 19 and 20 respectively and an additional compartment 21 which is filled with pure water or with an acid solution is placed between the compartments 20 and 38. The compartment 21 is separated from the compartment 20 by a cation-exchange membrane 25; the same applies to the compartments 17 and 18. On the other hand, there is placed between the compartments 21 and 38 an anion-exchange membrane 26, for example of the type marketed by the Asahi Company under the trade name AMC 10. The compartments 17 and 38 contain respectively dilute solutions of acid and of base, preferably decinormal solutions of sulphuric acid and potassium. The electrodes of the compartments 17 and 38 are fabricated from a noncorrosive conductive material such as platinum or graphite or alternatively, are covered with a continuous outer layer of said material.

The compartments 17 to 38 which constitute the device under consideration have preferably the shape of right parallelepipeds of substantial height with respect to the base rectangle. It is indicated by way of example that use can be made of parallelepipeds having a height of 60 cm. in respect of a base rectangle measuring 10 cm. x 1.5 cm.

The six compartments which have just been mentioned form an assembly having common side faces, top faces and bottom faces.

At the level of the upper extremity of the compartment 18, provision for an opening 30 through which the solution to be processed is introduced whilst a solution which is depleted in calcium ions is collected through an opening 31 at the lower end of said compartment.

A solution of $NH_4Cl$ which is preferably centinormal is fed through an opening 33 at the top end of the compartment 19 and has the intended function of eluting the potassium which would pass into the compartment 19 under the influence of the current. A solution which is depleted in calcium is also collected at the base of the compartment 19 through an opening 34. The solution of $NH_4Cl$ can be replaced by another solution such as, for example, a solution of another cation or another monovalent anion.

The compartment 20 is closed both at the bottom end and at the top end. However, at the bottom of the compartment 21, an aqueous solution of calcium is continuously withdrawn through an opening 36, the withdrawals being compensated by an admission of pure or acidulous water through a top opening 35, the acid which may be employed for this purpose being preferably chosen so as to ensure that it does not precipitate the ion to be removed, namely calcium in the case under consideration, in order to prevent the difficulties attached to removal of the precipitate.

By establishing a sufficient potential difference in respect of a current intensity of 200 ma., similar concentrations of K and Ca are obtained in respect of a throughput of 360 ml./hour; at the bottom of the compartments 18 and 19, the total quantity of potassium no longer contains more than approximately 20% calcium.

Figure 2:
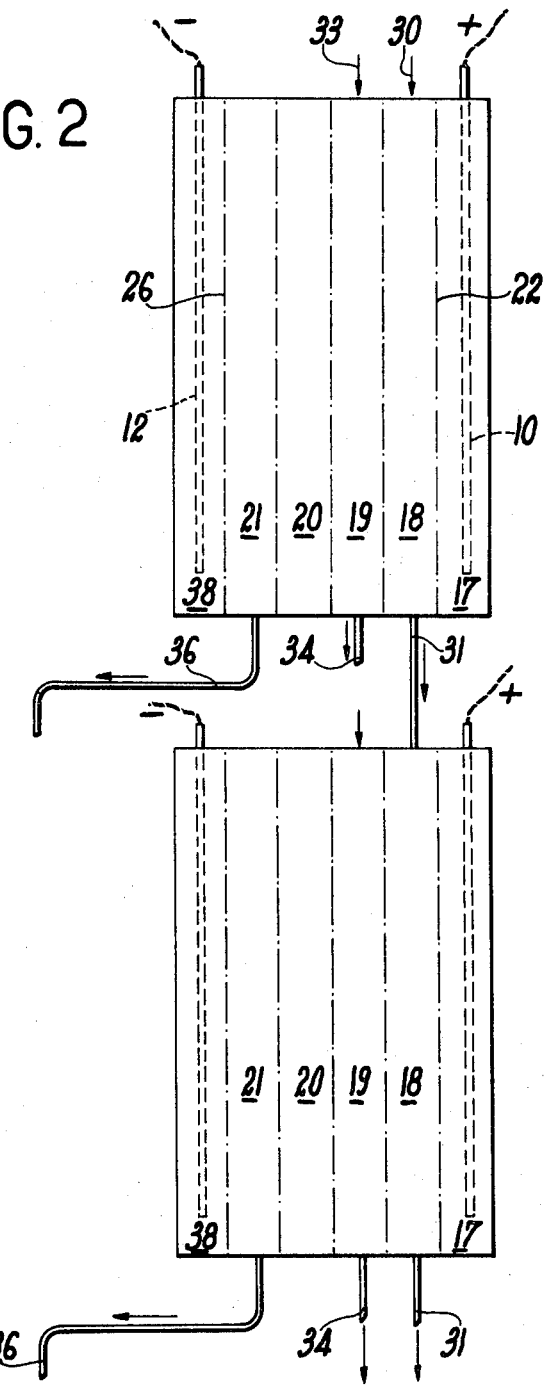

In order to improve the efficiency of the device hereinabove described, an identical device can be added thereto and is shown in FIG. 2.

Similar components have been given the same reference numerals as in FIG. 1.

At the outlet of the second device, there is obtained a solution which contains potassium of even higher purity whilst the calcium content can readily fall to 7%.

It is also possible to obtain high efficiency of separation by having recourse to a device which, in accordance with the principal arrangement of the invention, comprises a plurality of compartments filled with ion-exchange resin which are disposed in adjacent relation with interposition of means for limiting the transfer of ions which are not intended to be removed, means being provided for producing within said compartments an electric field substantially at right angles to the direction of propagation of the solution to be processed which is injected into intermediate compartments or compartments located in close proximity to the pole of opposite sign to that of the ions to be removed, further means being provided whereby the solution which is depleted in ions to be removed from the solution to be processed can be recycled and passed successively through the compartments in the direction of that pole whose sign is the same as the ions to be removed from the solution being processed.

Figure 3:
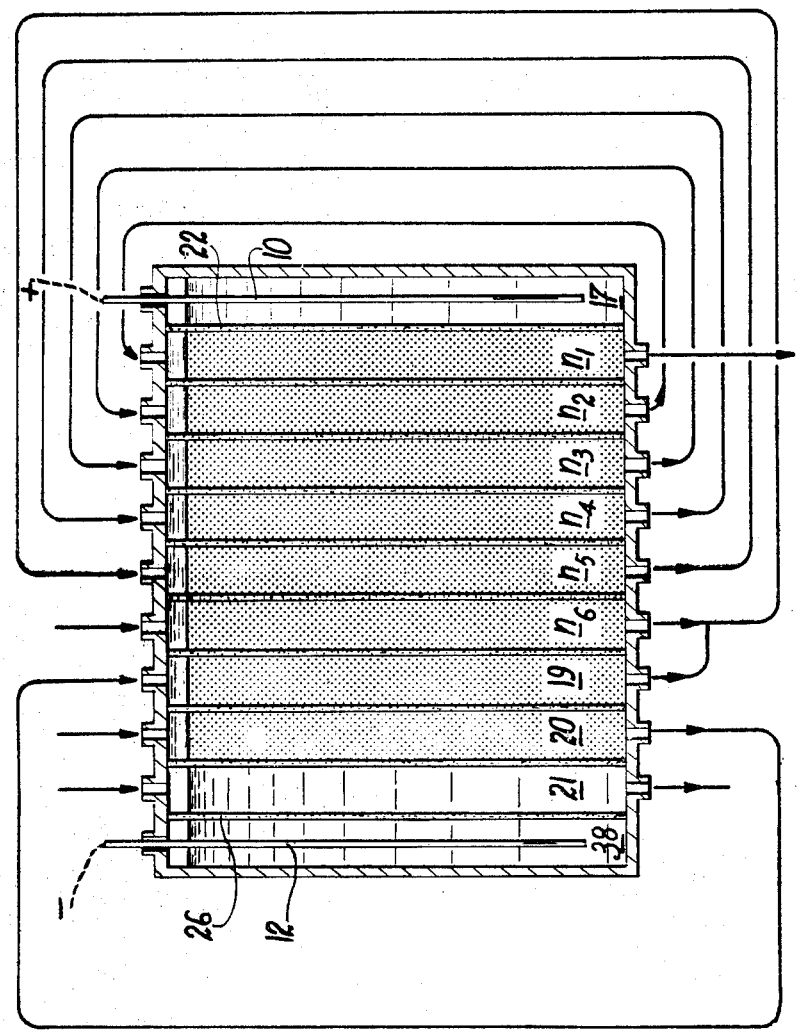
FIG. 3 is a diagrammatic sectional view of a device comprising recycling means.

There is shown in FIG. 3 one form of construction of a device of this type which comprises eight compartments filled with resin, six of which are assigned to the recycling operation.

In FIG. 3, the recycling compartments are designated by the references at $n_1$ to $n_6$, the solution to be processed being admitted at $n_6$. The two compartments which are filled with resin and not employed for the recycling operation are designated by the reference numerals 19 and 20.

It is readily apparent that, in the same manner as the device of FIG. 1, the device of the embodiment now under consideration can comprise an anode compartment, a cathode compartment and a water-filled compartment which are designated by the same references as in FIG. 1 as is the case with the other common elements.

There is fed into the compartment 20 a solution of $NH_4Cl$ having a concentration which is preferably of the same order of magnitude as the concentration of potassium of the solution to be processed.

The means which are capable of carrying out the recycling operation referred-to above along the paths indicated by arrows and which have not been illustrated are advantageously constituted by pumps or any means which make profitable use of the action of gravity and difference of pressure.

Provision can also be usefully made for similar means whereby the effluent which is collected at the outlet of the compartment 20 along the path indicated by an arrow is recycled to the compartment 19.

An apparatus has been employed in which each of the above-described compartments had the following dimensions:

|  | Cm. |
|---|---|
| Length | 10 |
| Width | 1.5 |
| Height | 40 |

If a potential difference in the range of 50 to 350 v. and preferably of 200 v. is then established in such manner that the current intensity is of the order of 0.6 to 0.7 a. and if a $10^{-2}$ N solution of $Ca^{++}$ and of $K^+$ is processed (the $NH_4Cl$ solution which is admitted at 20 having a concentration of 10 meq./liter), a separation which attains 95% purity in each ion is obtained in respect of a throughput of 1 liter/hour.

It will be readily apparent that the results given above can be improved even further by increasing the number of intermediate compartments.

The devices hereinabove described could also be made up of compartments which are disposed in concentric relation. Moreover, these devices can be adapted to work under pressure.

It should be pointed out that as a result of a lower conductivity of sodium, the separation of Ca and Na is even more efficient than that of Ca and K.

In the case of separation of ions having closely related properties such as the alkaline-earth ions, it may prove advantageous if a complexing agent which is selective for some of the ions is introduced in the resin bed at the same time as the solution to be processed.

The solution to be processed together with the added complexing agent is admitted in the form of a solution which has sufficiently low conductivity to ensure that the non-complexed ions which are adsorbed on the resin are capable of transporting the electric current by passing essentially through said resin whereas the complexed ions remain in the solution.

The complexing agents which are suitable for use in the method under consideration are advantageously selected from the group comprising ethylenediaminetetraacetic acid (EDTA), nitrilotriacetic acid and iminodiacetic acid and more generally from all the derivatives which are capable of forming a neutral or anionic complex with one of the cations.

Should it be necessary, for example, to process a solution containing a mixture of calcium and strontium, which is a problem frequently encountered when processing radioactive effluents, use will preferably be made of EDTA and also of the resin which is commercially available under the trade name Amberlite 120.

In order that the mixture to be processed in the form of a solution should have sufficiently low conductivity to ensure that the non-complexed ions, namely strontium in the present instance, should be capable of being adsorbed on the resin and of transporting the current through said resin, preference is accordingly given to the use of dilute solutions, the concentratoin of Ca and Sr being preferably within the range of $3 \times 10^{-2}$ and $3 \times 10^{-3}$ N. The quality of the separation increases with the dilution of the solution.

In order that practically only the calcium should be complexed, the pH value of the solution to be processed is adjusted to a value equal to or higher than 4. In practice, a slight excess of complexing agent is employed, taking into account the quantity of calcium to be complexed.

The equipment utilized is as shown in FIGS. 1 to 3. A dilute sulphuric acid solution and a dilute potassium solution are circulated in the anode and cathode compartments respectively. The solution to be processed and the complexing agent are fed through the opening 30 at the top of the compartment 18. A solution which is enriched in calcium is collected at the bottom of said compartment through the opening 31. An additional quantity of complexing agent is fed through the opening 33 at the top of the compartment 19 and a solution which is enriched in calcium is collected at the bottom end of said compartment through the opening 34. A solution which is enriched in strontium is withdrawn through the opening 36 at the bottom end of the compartment 21.

Either pure water or an acid solution (the acid which is chosen must not precipitate the non-complexed ion, namely strontium in the present case) is introduced at 35 at the top face of the compartment 21 in order to compensate for the losses caused by the withdrawals effected at the bottom face.

The strontium can also be withdrawn in the form of a solid compound by precipitation within the compartment 21.

It should be noted that, in order to increase the ionic strength of the solution and in order to provide a buffer action, $NH_4^+$ ions are advantageously added in the form of $NH_4Cl$ or $NH_4OH$.

By establishing throughputs of 350 ml./hour within the compartments 18 and 19 of said apparatus (the solution fed into the compartment 18 contains 10 meq./liter respectively of $CaCl_2$, $SrCl_2$ and $NH_4OH$, as well as 12 meq./liter of EDTA, whereas the solution which was fed into the compartment 19 contained 5 meq./liter of EDTA and 10 meq./liter of $NH_4Cl$), and the current intensity being 200 ma., the entire quantity of calcium and only a part of the strontium is collected at the outlets of the comparments 18 and 19.

It should be mentioned that already 70 to 95% of the initial calcium is collected at the outlet of the compartment 18.

In conclusion, it can therefore be stated that, starting from a solution which has an identical concentration of calcium and of strontium, a proportion of 60 to 70% Ca and 30 to 40% Sr is collected at the outlet of the compartment 18 and this solution as collected at the outlet of the compartment contains 80 to 90% of the initial quantity of Ca. The compartments 20 and 21 contain Sr in a practically pure state.

In order to improve these results, two of the devices shown in FIG. 1 can be connected in series as shown diagrammatically in FIG. 2.

There is then obtained at the outlet of the compartment 18 of the second device a solution having a composition of approximately 80% Ca and 20% Sr.

It has been found by calculation that the ratio of ionic fractions of strontium is 1.7 at the inlet and at the outlet of any particular compartment. In consequence, by extending the "cascade" which is formed by the above-mentioned combination of two identical devices, the purification may be carried out to as high a degree as may be found necessary.

If it is desired to obtain a very high separation factor, the device which is illustrated in FIG. 3 is advantageously employed.

An actual apparatus has been employed in which each compartment had the following dimensions:

|  | Cm. |
|---|---|
| Length | 10 |
| Width | 1.5 |
| Height | 40 |

By establishing a potential difference within the range of approximately 50 to 350 v., and preferably of the order of 200 v. so as to have a current intensity of the order of 0.6 to 0.7 a., and by processing a $10^{-2}$ N solution of $Ca^{++}$ and of $Sr^{++}$ (the concentration of EDTA being 15 meq./liter, the solution of EDTA which is admitted at 20 having a concentration of 7 meq./liter), a separation which attains 95% purity in each ion is obtained in respect of a throughput of 1 l./h.

The pH value of the solutions is 8.5 in all cases except in the last compartment, namely compartment $n_1$, in which the pH drops to 4–4.5.

The quality of the separation can obviously be increased even further by increasing the number of recycling compartments.

The present invention finds a particularly valuable application in water softening and the demineralization of water, namely city supply water, brackish water and sea water.

In the softening process, it is sought to eliminate or replace the polyvalent ions and especially calcium.

In the case of demineralization, practically all the cations other than hydrogen are removed from the water being treated.

By resorting to the use of an apparatus of the type shown in FIG. 1 and described in the foregoing, consideration was given to the influence of the following factors:

time ($t$) expressed in secs.,
current intensity (I) expressed in ma.,
delivery of the processed solution (D) expressed in l/sec.,
concentration of the solution in ions to be removed (C) expressed in meq./l., and it was determined that the ratio designated as $f$ and defined by:

$$\frac{\Sigma It}{\Sigma DCt} = f$$

can advantageously, in the case of tap water and depending on the composition of the water and the desired result, be comprised between 0.5 and 5 in the case of water softening and between 2 and 12 in the case of demineralization of water.

Removal of cations can be carried out in a first apparatus such as the apparatus shown in FIGS. 1, 2 or 3. The removal of anions other than $O.H^-$ is carried out in a second apparatus which is identical with the first but in which the resin in this case is an anion-exchange resin, for example of the type known as Amberlite IRA 400. In addition, the cation-exchange membranes are replaced by anion-exchange membranes and the solution which passes out of the device for removal of cations is fed into that compartment which is located close to the cathode. The succession of transfer processes from one apparatus to another can be repeated.

At a given moment of the operation, especially in the water-softening process but also in the demineralization process, it may be found necessary only to reduce the acidity of the water. With this object in mind, weakly basic resins (for example Amberlite IR 45) can be employed in the second apparatus referred-to above.

It should be pointed out in addition that the ion-exchange membranes can be replaced by layers of resin beads, the size of which is chosen so as to obtain a similar effect. Said layers must hold up the solution but must not prevent the passage of the current. Plates of sintered or finely granulated material as well as sheets of cellophane are also suitable for the purpose.

It is to be noted by way of example that, by treating water which contains mainly:

|  | Meq./liter |
|---|---|
| Mg+Ca | 5 |
| Na | 1 |
| Bicarbonate | 4.5 | there was obtained:

In the case of a throughput of 200 ml./hour and at a voltage of 12 v. (that is to say with a current intensity of approximately 80 to 100 ma.), the removal of the major part of the calcium and from 30 to 60% of the sodium, which is equivalent to extensive softening, the ratio $f$ being in that case within the range of 3 to 3.5;

In the case of a throughput of 200 ml./hour and at a voltage of 24 v. (that is to say in the case of a current intensity of approximately 200 to 250 ma.), the removal of practically all the cations, which is equivalent to the first stage of demineralization, the ratio $f$ being in that case within the range of 6 to 7.5.

The result can readily be judged by indicating that, if the anions are also removed, the water obtained in the first case referred-to above has a resistivity of $10^4$ $\Omega$cm. and in the second case has a resistivity of 2 to $3 \times 10^5$ $\Omega$cm.

According to an advantageous arrangement of the invention, the removal of anions and cations is carried out in a same apparatus by passing the water to be treated successively through cation-exchange and anion-exchange resin beds.

The resins employed in this plant are chosen for their selectivity with respect to the ions to be removed as well as for their conductivity. Among the selective resins, preference will be given to those which have the highest conductivity.

By way of indication, mention can be made of the sulphonic resins or the carboxylic resins which have a low degree of cross-linking or alternatively the phosphonic and phosphoric resins.

The use of amphoteric resins can prove advantageous in the case of demineralization of water. The amphoteric resins are usually anion-exchange resins having a low pH value and cation-exchange resins having a high pH value. In this case, the resins are placed between an anionic membrane and a cationic membrane.

The method is carried out in an electrolytic tank comprising a central anode and at least two cathodes disposed on each side of the anode. Ionic membranes divide the tank into a series of compartments. A plurality of said compartments which are placed on each side of the anode and adjacent to each other are filled respectively with cationic and anionic resins.

The cation-exchange resin beds are separated from each other by cationic membranes and the anion-exchange resin beds are separated from each other by anionic membranes. The water to be treated passes first through a cation-exchange bed in which it is freed of its cations which migrate towards the cathode under the action of the electric field, then circulates through an anionic resin bed in which it is freed from anions. Said anions migrate towards the anode and form with the hydrogen ions produced at the anode acids which are eliminated.

The inventors have shown the favorable influence of the temperature on the current efficiency. The temperature has the effect of improving the ratio $f$ which has been defined earlier.

An increase in temperature makes it possible to pass through the apparatus a larger volume of water for a same potential difference at the electrode terminals.

According to another important arrangement of the invention, the gases which are evolved at the electrodes, namely hydrogen, oxygen and chlorine, are recombined. The advantage of such an arrangement which makes it possible to avoid the problems of evacuation, corrosion and toxicity in the case of chlorine can readily be appreciated. The recombination of gases can be carried out by means of a catalyst. Mention can be made by way of example of the catalysts which have a base of platinum, nickel or palladium which are employed either alone or deposited on substrates and, in general, all the hydrogen oxidation catalysts. The recombination of the gases evolved during electrolysis is of particular interest when the device is employed in poorly ventilated locations in which the accumulation of the gases formed can prove dangerous.

In the case of larger treatment plants, it would be feasible to supply a fuel cell with the hydrogen and oxygen which are evolved at the electrodes and to employ the electrical energy thus generated for the purpose of operating the apparatus proper.

A plant for water softening and demineralization of water in accordance with the invention is shown in FIG. 4.

The electrolytic tank 1 comprises a central anode 10 and two cathodes 11 and 12 which are placed at the ends of the tank. Said tank is divided into a series of compartments by ionic membranes such as the membrane 22. The compartments 18, 19 and 20 are filled with cation-exchange resin. The membranes 22, 23, 24 and 25 are cationic membranes. The compartments 14 and 15 are filled with anion-exchange resins. The membranes 27, 28 and 29 are anionic membranes.

The water to be treated is admitted at the top of the compartment 19 through the inlet pipe 30. The cations such as $Ca^{2+}$, $Na^+$ migrate towards the cathode under the action of the electric field. These cations are carried into the cathode compartment 21 by a wash water which is admitted at 31 and discharged at 32. The water which passes out of the compartment 19 is passed through the pipe 33 to the top of the compartment 18. There is withdrawn at 34 water in which the Ca and Mg ions are replaced by $H^+$ in the case of water-softening and in which all the cations including Na are replaced by $H^+$ in the case of demineralization. The water referred-to is passed to the top of the compartment 15 if total demineralization is desired. Under the action of the electric field the anions such as $Cl^-$, $SO_4^{2-}$, $CO_3^{2-}$, are directed towards the compartment 16. The water which passes out of the compartment 15 is recycled to the top of the compartment 14. Totally demineralized water is withdrawn at the bottom of said compartment through the pipe 37. The membrane 26 is a cationic membrane which prevents the chlorine from passing into the anode compartment. A wash water which is admitted at 35 and withdrawn at 36 eliminates the acids which are formed.

An apparatus as hereinabove described has been operated for a period of approximately ten months. The electrodes were made of titanium alloyed with platinum. The membranes had a surface area of 500 x 300 mm. The distance between the membranes was 20 mm. The cationic membranes were of the type known as Asahi CMV and the anionic membranes were of the type known as Amberplex A 10. The cationic resin was of the type known as Amberlite–IR 120 and the anionic resin was of the type known as Amberlite IRA 400.

The water to be treated, which had the following composition:

|  | Meq/liter |
|---|---|
| Mg+Ca | 5 |
| Na | 1 |
| Bicarbonate | 4.5 | was fed into the apparatus at a rate of 2.5 l./h. The current intensity was within the range of 2 to 4 A. at 12 volts approximately in the case of the cationic compartments and 200 to 700 ma. in the case of the anionic compartments. The factor $f$ had a mean value of 5.5 in the case of the cationic compartment and 1.5 in the case of the anionic compartment. The water collected at the outlet of the apparatus had a conductivity of $5 \times 10^{-6}$ $\Omega^{-1}$. cm.$^{-1}$ and a pH value of the order of 5.

In a second example of application, brackish water was treated and had the following composition:

| | Meq/liter |
|---|---|
| Mg+Ca | 10 |
| Na | 50 |
| Bicarbonate | 5 |
| Cl⁻ | 55 |

The brackish water was fed into the apparatus at a rate of 1.5 l./h. The current intensity was within the range of 5 to 7 a. at a voltage of 12 volts in the case of the cationic compartments and 200 to 700 ma. in the case of the anionic compartments. The water collected at the outlet of the apparatus had a conductivity of $10 \times 10^{-5}$ $\Omega^{-1}$. cm.$^{-1}$.

The mean operating temperature was 15° at the inlet of the apparatus and 18° at the outlet. It has been observed and demonstrated experimentally that, in respect of a same throughput of water to be treated, a same voltage across the electrode terminals, the current intensity increased by approximately 25% in the case of the compartments containing the cation exchangers when the inlet temperature rose from 20 to 30° C.

The determinations of conductivity of the ion exchangers confirm the above results inasmuch as said conductivities increase with the temperature in the same manner as those of the electrolytic solutions.

For the treatment of sea water, use is made of a plurality of devices placed in series.

The method in accordance with the invention has the advantage of permitting continuous operation without supervision and without entailing the need of chemical regeneration of the resin as in conventional processes.

What we claim is:

1. A method for the separation of ions from a solution by an electrolytic process, the steps of passing said solution downwardly over ion exchange resins contained in at least two intermediate compartments positioned between an anodic and a cathodic compartment of an electrolytic cell, each intermediate compartment being bounded by two ion exchange membranes, all the membranes of the intermediate compartments being of the same polarity to pass freely the ions to be removed while preventing passage of the ions of a polarity opposite to that of the ions to be removed, circulating said solution in each intermediate compartment transversely to an electric field established through each intermediate compartment between an anode and a cathode respectively located in said anodic and cathodic compartments and collecting said ions to be removed in an additional intermediate compartment free of ion exchange resin located adjacent to the compartment containing the electrode of opposite sign to the ions to be removed, said additional compartment being separated from said adjacent electrode by a membrane selectively permeable to ions of the same polarity as said adjacent electrode.

2. A method as described in claim 1 including the step of circulating a complexing agent selective of the ions to be removed in one of said intermediate compartments containing ion exchange resin.

3. A method as described in claim 1 including the step of recycling the treated solution depleted in ions successively through a series of intermediate compartments extending in the direction of the electrode of the same polarity as that of the ions to be removed from the solution.

4. A method as described in claim 2 including the step of recycling the treated solution depleted in ions successively through a series of intermediate compartments extending in the direction of the electrode of the same polarity as that of the ions to be removed from the solution.

5. A method as described in claim 1 including the step of catalytically recombining the hydrogen, oxygen and chlorine evoked at the electrodes.

6. A method for the separation of ions from a solution by an electrolytic process, the steps of passing said solution downwardly over ion exchange resins contained in two series of intermediate compartments positioned between an anodic compartment and two cathodic compartments of an electrolytic cell, one series of compartments containing anionic exchange resin and the other containing cationic exchange resin, each intermediate compartment being bounded by two ion exchange membranes, all the membranes of the compartments containing the anionic exchange resin being anionic and those of the intermediate compartments containing the cation exchange resin being cationic to pass freely with an electric current the ions to be removed while preventing passage of the ions of a polarity opposite to that of the ions to be removed, circulating said solution in each intermediate compartment transversely to an electric field established through each series of intermediate compartment between an anode and cathodes respectively located in said anodic compartment and said cathodic compartments, collecting the evolved ions as acid in an additional intermediate compartment free of ion exchange resin located adjacent to the anodic compartment, said additional intermediate compartment being separated from said anode by an anionic membrane, removing the ions to be removed from one of the cathodic compartments, and circulating said solution from the series of intermediate compartments containing the cation exchange resin to the series of intermediate compartments containing the anion exchange resin.

References Cited

UNITED STATES PATENTS

| 2,815,320 | 12/1957 | Kollsman | 204—180 P |
| 2,906,685 | 9/1959 | Stoddard et al. | 204—180 P |
| 2,923,674 | 2/1960 | Kressman | 204—180 P |
| 3,149,061 | 9/1964 | Parsi | 204—180 P |
| 3,394,068 | 7/1968 | Calmon et al. | 204—180 P |

TA-HSUNG TUNG, Primary Examiner

U.S. Cl. X.R.

204—301